Aug. 6, 1929.  W. H. LITZENBERGER  1,723,486
CULTIVATOR RAKE
Filed Jan. 31, 1927    2 Sheets-Sheet 2
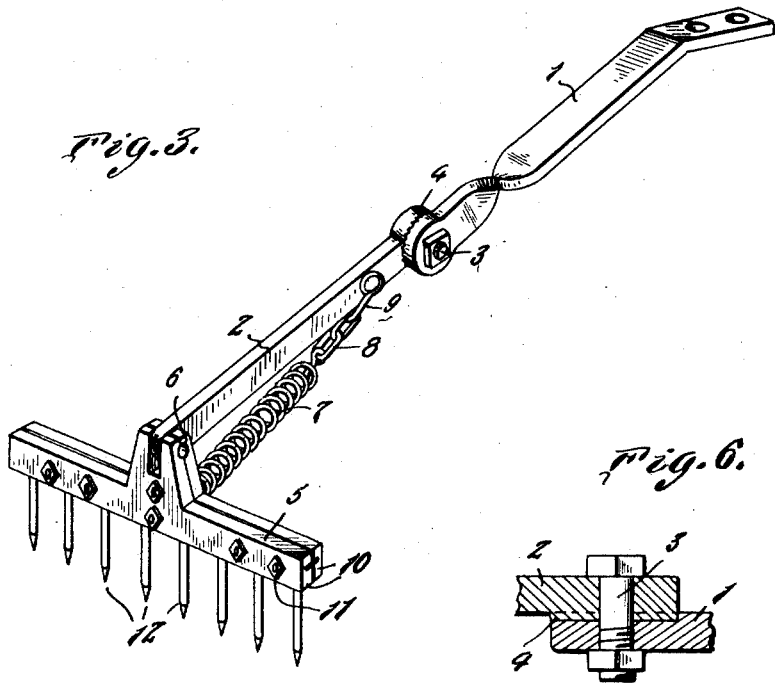
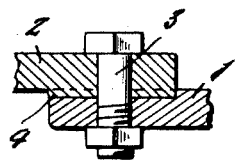
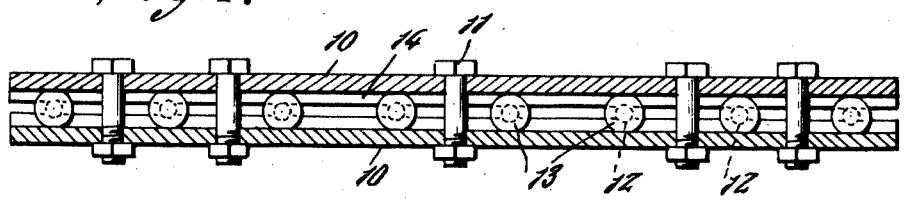
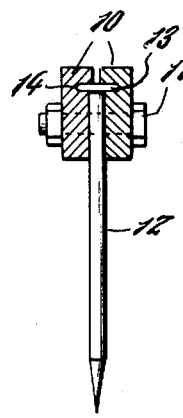
W. H. Litzenberger
INVENTOR
BY Victor J. Evans
ATTORNEY Patented Aug. 6, 1929.

1,723,486

UNITED STATES PATENT OFFICE.

WILLIAM. H. LITZENBERGER, OF NORWOOD, ILLINOIS.

CULTIVATOR RAKE.

Application filed January 31, 1927. Serial No. 164,910.

This invention relates to a rake attachment for a cultivator, the general object of the invention being to provide means for causing the rakes to follow the plows so as to smooth and pulverize the soil turned up by the plows and to remove trash and the like.

Another object of the invention is to provide means for stirring the soil close to the plows.

A still further object of the invention is to provide spring means for holding each rake in raking position so that the rakes can automatically rid themselves of trash collecting on them by moving rearwardly against the action of the spring means, such means also permitting the rakes to move forwardly when the cultivator is backed, thus avoiding breakage of the parts.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 3 is a view of one of the rake attachments.

Figure 4 is a section on line 4—4 of Figure 1.

Figure 5 is a section on line 5—5 of Figure 2.

Figure 6 is a section on line 6—6 of Figure 1.

Figure 1:
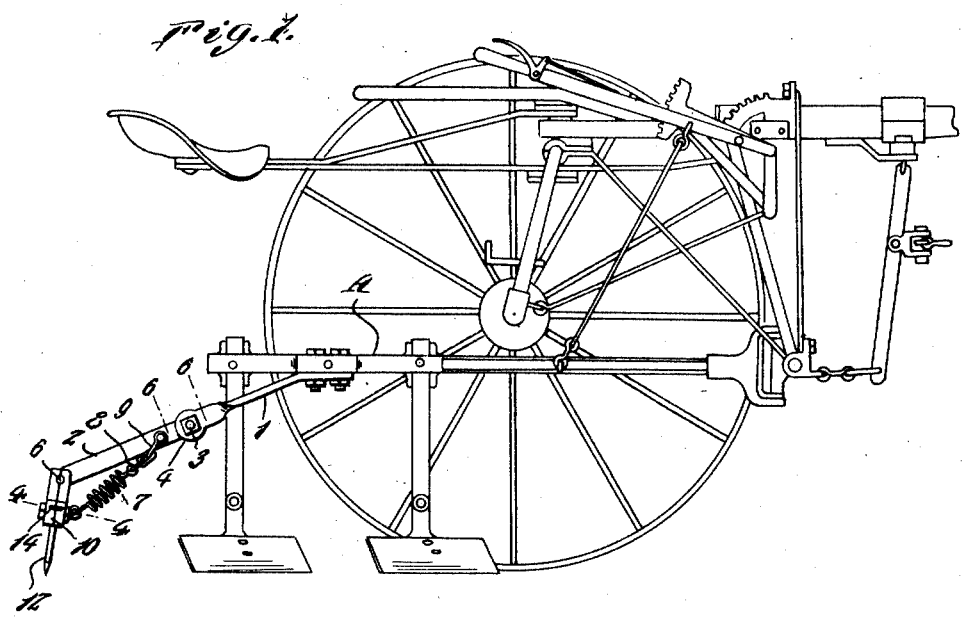
Figure 1 is a side view of a cultivator, showing the invention in use thereon.
Figure 2:
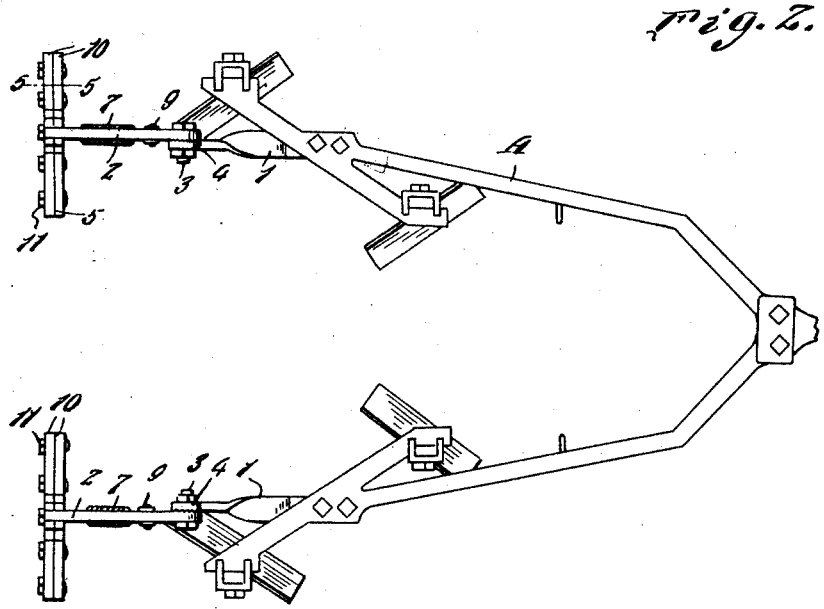
Figure 2 is a plan view of parts of Figure 1.

As shown in these drawings, I attach one of the rake attachments to each side of the cultivator which is shown generally at A, the parts being so positioned that the rakes will follow the plows. Each attachment comprises a bar 1 which is adapted to be bolted or otherwise fastened to each of the plow carrying parts of the cultivator, the bar extending downwardly and rearwardly and a second bar 2 is adjustably attached to the end of the bar 1 by means of the bolt 3, the contacting parts of the bars 1 and 2 being enlarged and provided with the teeth 4 so that when the bolt is tightened, the bar 2 will be firmly held in adjusted position on the bar 1. The rake 5 is pivoted to the end of the bar 2 by the pin 6 and a coiled spring is connected with the rake and to a short chain 8 which is attached to the upper end of the bar 2 by the clevis 9.

Each rake is composed of the two parts 10 which are fastened together by the bolts 11 and the teeth 12 have their heads 13 held in the grooves 14 formed in the inner faces of the parts 10 by the clamping action of the bolts. This arrangement will permit worn teeth to be removed and substituted by new ones and it will also permit teeth to be added to the rake or taken therefrom.

The spring 7 will permit the rake to swing rearwardly so as to dump trash collecting thereon, after which the spring will return the rake to normal position. It will also permit the rake to ride over obstructions and if the cultivator should be backed, the rake will swing forwardly so that the parts will not be damaged.

This device will smooth and pulverize the soil turned up by the plows and it can also be used for stirring the soil close to the plants by having it pass along the row when the plants are small. When the device is used for this purpose, the bar 2 should be so adjusted on the bar 1 that the teeth will but lightly engage the soil so as not to dig up the plants. It may be necessary to remove some of the plows when the attachment is used in this way.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A rake attachment for a cultivator comprising a bar adapted to be fastened to a cultivator, a second bar adjustably connected with the first bar so that it can be swung about a horizontal axis, a rake pivoted to the lower end of the second bar, a spring connecting the rake with the upper end of the second bar, said rake being formed of two sections bolted together, each section having a groove therein and headed teeth having their heads engaging the grooves.

In testimony whereof I affix my signature.

WILLIAM H. LITZENBERGER.